United States Patent [19]

Sanada et al.

[11] Patent Number: 5,329,609
[45] Date of Patent: Jul. 12, 1994

[54] RECOGNITION APPARATUS WITH FUNCTION OF DISPLAYING PLURAL RECOGNITION CANDIDATES

[75] Inventors: Toru Sanada; Shinta Kimura, both of Kawasaki; Kyung-Ho Loken-Kin, Yokohama, all of Japan

[73] Assignee: Fujitsu Limited, Kanagawa, Japan

[21] Appl. No.: 737,871

[22] Filed: Jul. 30, 1991

[30] Foreign Application Priority Data

Jul. 31, 1990 [JP] Japan .................................. 2-201259
Jan. 11, 1991 [JP] Japan .................................. 3-013714

[51] Int. Cl.$^5$ .............................................. G10L 9/00
[52] U.S. Cl. .................................... 395/2.6; 395/2.44; 395/2.85
[58] Field of Search ...................................... 381/41–48; 395/2.85, 2.6, 2.44, 600; 382/30, 57; 364/200

[56] References Cited

U.S. PATENT DOCUMENTS

| | | | |
|---|---|---|---|
| 4,378,466 | 3/1983 | Esser | 395/2 |
| 4,510,567 | 4/1985 | Chang et al. | 395/600 |
| 4,862,356 | 8/1989 | Van Trigt | 364/200 |
| 4,866,778 | 9/1989 | Baker | 395/2 |
| 5,027,406 | 6/1991 | Roberts et al. | 395/2 |
| 5,031,113 | 7/1991 | Hollerbauer | 381/48 |
| 5,058,167 | 10/1991 | Kimura | 381/43 |

Primary Examiner—Michael R. Fleming
Assistant Examiner—Michelle Doerrler
Attorney, Agent, or Firm—Nikaido, Marmelstein, Murray & Oram

[57] ABSTRACT

A dictionary order sorter resorts character strings of recognition candidates stored in a high-ranking candidate memory in the order of distance into a dictionary order (character code order). Upon receipt of a sort termination signal a display controller displays the character strings of recognition candidates stored in the high-ranking candidate memory in the dictionary order and their ranking numbers in order on a display. Where an attribute-dependent sorter is provided in place of the dictionary order sorter, the character strings of recognition candidates stored in the distance order in the high-ranking candidate memory are sorted (grouped) according to attribute information of categories, such as parts of speech, concepts, etc., which are stored in a template memory for each of the recognition candidates and then displayed classified into groups. The categories of attribute information can arbitrarily be specified by the user. The user can easily select the correct recognition candidate from among the recognition candidates displayed rearranged in a fixed order of priority as described above.

11 Claims, 14 Drawing Sheets

|    |          |    |          |    |          |
|----|----------|----|----------|----|----------|
| 1  | HOZAKA   | 11 | HOUSAKA  | 21 | OCHISAKA |
| 2  | HOUZAKA  | 12 | KOSAKA   | 22 | TOOSAKA  |
| 3  | KOZAKA   | 13 | TOSAKA   | 23 | TOUSAKA  |
| 4  | KOUZAKA  | 14 | OTSUSAKA | 24 | NOZAKA   |
| 5  | TOZAKA   | 15 | HOSHISAKA| 25 | OOSAKA   |
| 6  | HIKOZAKA | 16 | OSAKA    | 26 | OUSAKA   |
| 7  | HOTSUZAKA| 17 | KOUSAKA  | 27 | ONOZAKA  |
| 8  | OZAKA    | 18 | HOSSAKA  | 28 | HOTAKA   |
| 9  | HOSAKA   | 19 | OZAOKA   | 29 | OSHISAKA |
| 10 | KOSAKA   | 20 | KOSHISAKA| 30 | KOUTAKA  |

Fig.3 PRIOR ART

|    |          |    |          |    |          |
|----|----------|----|----------|----|----------|
| 1  | HIKOSAKA | 11 | KOSAKA   | 21 | OSAKA    |
| 2  | HIKOZAKA | 12 | KOSHISAKA| 22 | OSHISAKA |
| 3  | HOSAKA   | 13 | KOUSAKA  | 23 | OTSUSAKA |
| 4  | HOSHISAKA| 14 | KOUTAKA  | 24 | OUSAKA   |
| 5  | HOSSAKA  | 15 | KOUZAKA  | 25 | OZAKA    |
| 6  | HOTAKA   | 16 | KOZAKA   | 26 | OZAOKA   |
| 7  | HOTSUSAKA| 17 | NOZAKA   | 27 | TOOSAKA  |
| 8  | HOUSAKA  | 18 | OCHISAKA | 28 | TOSAKA   |
| 9  | HOUZAKA  | 19 | ONOZAKA  | 29 | TOUSAKA  |
| 10 | HOZAKA   | 20 | OOSAKA   | 30 | TOZAKA   |

Fig.12

INPUT SENTENCE: ANATAHA HONO YONDEIMASUKA.

(NUMBERS DESIGNATE RECOGNITION SIMILARITY)

| CANDIDATE ORDER | ANATAHA | HONO | YONDEIMASUKA |
|---|---|---|---|
| 1 | ANATATO (2458) | HONO (2237) | SUNDEIMASUKA (2407) |
| 2 | ANATAHA (2497) | HONMO (2636) | KOTAETEIMASUKA (2706) |
| 3 | ANATAGATAHA (2582) | HONNO (2644) | YONDEIRUNODESUKA (2779) |
| 4 | ANATAGA (2706) | HONTO (3100) | OYOIDEIRUNODESUKA (2847) |
| 5 | HANAKOGA (2731) | KOOENNO (3176) | YONDEKUDASAI (2948) |
| 6 | YAMADAHA (2753) | HONGA (3180) | YONDEMORAEMASUKA (2975) |
| 7 | ANATAGATA (2804) | BOORU (3267) | NOTTEMORAEMASUKA (3012) |
| 8 | NAKAHA (2821) | MONOMO (3314) | YONDEIMASUKA (3042) |

Fig. 4 PRIOR ART

INPUT WORD 類似度

| CANDIDATE ORDER | 類 | 似 | 度 |
|---|---|---|---|
| 1 | 原頁 (2458) | 似 (2237) | 唐 (2427) |
| 2 | 類 (2497) | 以 (2636) | 度 (2436) |
| 3 | 頗 (2582) | 他 (2544) | 度 (2779) |
| 4 | 締 (2717) | 仮 (3100) | 店 (2847) |

| CANDIDATE ORDER | RECOGNITION CANDIDATES | RECOGNITION DISTANCE |
|---|---|---|
| 1 | SENSEI | 2071 |
| 2 | SENSEIMO | 2460 |
| 3 | DETE | 2827 |
| 4 | DERU | 2924 |
| 5 | SEITO | 3112 |
| 6 | SUNDE | 3234 |
| 7 | SHIMEMASEN | 3274 |
| 8 | SUMEMASEN | 3317 |

Fig.15B

```
SENSEI
SENSEIMO

SEITO

SUNDE
SUMEMASEN

DETE
DERU
```

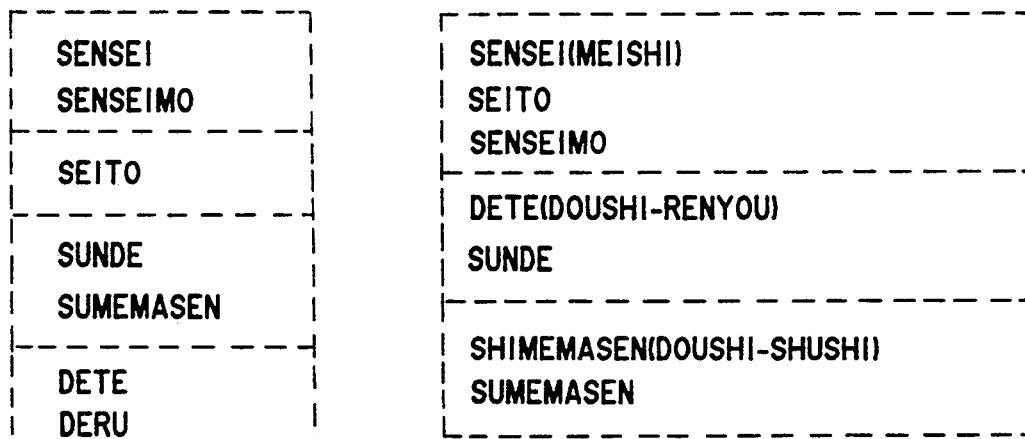

Fig.15C

```
SENSEI(MEISHI)
SEITO
SENSEIMO

DETE(DOUSHI-RENYOU)
SUNDE

SHIMEMASEN(DOUSHI-SHUSHI)
SUMEMASEN
```

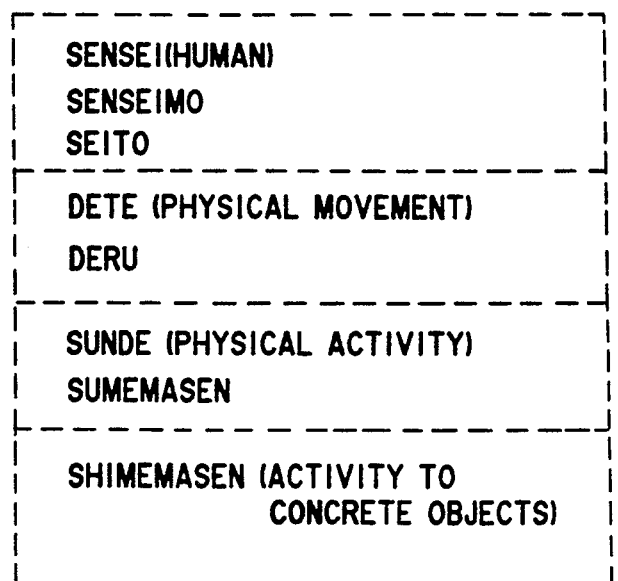

Fig.15D

```
SENSEI(HUMAN)
SENSEIMO
SEITO

DETE (PHYSICAL MOVEMENT)
DERU

SUNDE (PHYSICAL ACTIVITY)
SUMEMASEN

SHIMEMASEN (ACTIVITY TO
           CONCRETE OBJECTS)
```

RECOGNITION APPARATUS WITH FUNCTION OF DISPLAYING PLURAL RECOGNITION CANDIDATES

BACKGROUND OF THE INVENTION

1. Field of the Invention

The present invention relates to a recognition apparatus, such as a voice recognition apparatus, a character recognition apparatus, etc., which displays a plurality of recognition candidates obtained by recognition processing and thereby permits a user to select a recognition result from among the recognition candidates.

2. Description of the Related Art

In a voice recognition apparatus, such as a large-vocabulary voice recognition system, etc., a recognition candidate which is best in recognition score is not necessarily right because of the performance limit of the voice recognition system used. For this reason, use is made of a man-machine system arranged such that high-ranking candidates which are high in recognition score are displayed on a display unit and the user selects the right candidate out of the displayed candidates.

FIG. 1 illustrates a conventional large-vocabulary voice recognition system.

A voice to be recognized is entered into a microphone 101 and then digitized by an A/D converter 102. The digitized voice is subjected to frequency analysis in a frequency analyzer 103 for conversion into a time-series pattern of parameters representing the frequency characteristic of a phoneme of the voice. The parameters include, for example, powers of frequency components, LPC coefficients resulting from linear prediction analysis and cepstrum coefficients resulting from cepstrum analysis.

In a DTW matching section 104, the time-series pattern is matched against the time-series pattern of each word stored in a template memory 105 by means of the dynamic time-warping method. The matching section carries out the comparison between the two time-series patterns while normalizing (expanding and contracting) their time bases on the basis of a dynamic programming technique. Thereby, a distance value ( for example, the Euclidean distance between the parameters) between the input voice and each word stored in the template memory 105 is calculated.

These distance values are sorted (rearranged) in the order of distance in a distance order sorter 106, so that distance values taking predetermined high ranks beginning with the smallest and information on character trains of the corresponding word candidates are stored in a high-ranking candidate memory 107.

If word candidates which take, for example, the first to thirtieth ranks are stored in the high-ranking candidate memory 107, the distance order sorter 106 will execute such operations as indicated in steps S2 to S5 of FIG. 2.

That is, first, in step S1, the contents of the high-ranking candidate memory 107 are initialized.

Next, in step S2, a character string of a word candidate and a distance value are read from the DTW matching section 104. When NO in step S3, the distance value is written into the 31st address area of the high-ranking candidate memory 107 in step S4.

In step S5, the distance value which has been written into the 31st address area is sequentially compared with distance values of word candidates which had been written into the 1st to 30th address areas of the high-ranking candidate memory 107 in ascending order of distance values when the 31th address area was written into, so that the distance values stored in the 1st to 31st address areas are sorted.

The above steps S2 to S5 are repeated until the distance values for all the word candidates have been read from the DTW matching section 104, namely, until the determination result "YES" is obtained in step S3.

A sort termination signal is sent from the distance order sorter 106 to a display controller 108 at the termination of sort processing in the order of distance. Upon receipt of the sort termination signal the display controller 108 displays the character strings of word candidates stored in the high-ranking candidate memory 107 in the distance order and their ranking numbers on the display unit 109. In the above case, for example, the display controller 108 displays a character string of each of the word candidates stored in the 1st to 30th address areas of the high-ranking candidate memory 107 as the process in step S2 in FIG. 2. On termination of the display, the display controller 108 sends a display termination signal to a word select controller 110.

Upon receipt of the display termination signal, the word select controller 110 accepts the ranking numbers of word candidates entered by the user from a keyboard 111 or a mouse 112, which is a pointing device, and then outputs character strings of the correct words corresponding to the entered ranking numbers to another device, an application program, etc., which are not shown in particular.

FIG. 3 illustrates a first display example of word candidates displayed on the display unit 109 (see FIG. 1 ) in the above-described conventional voice recognition system. As can be seen from the figure, even if the user wants to specify the word "OOSAKA" corresponding to the user's utterance from among the displayed word candidates, it will be very difficult for the user to search for the object word. As described above, the problem with the first prior art is that it takes long for the user to search for the correct answer. This will increase psychological burden and stress imposed on the user.

Next, FIG. 4 illustrates a second display example of word candidates displayed by the display unit 109 in the above-described conventional voice recognition system. When utterances corresponding to a Japanese sentence "ANATAHA HONO YONDEIMASUKA" are entered from the microphone 101, the system of FIG. 1 performs a recognition process continuously. In the high-ranking candidate memory 107 are stored character strings of word candidates of each of the words composing the input sentence and their ranking numbers in ascending order of distance. Upon receipt of a sort termination signal indicating the termination of sorting of the input words from the distance order sorter 106, the display controller 108 displays character strings of word candidates taking the first to eighth ranks, their ranking numbers and their distance values for each word as shown in FIG. 4. Hereinafter, such a combination of word candidates displayed in the form of a table for plural words is referred to as a word candidate lattice. Here, figures within parentheses for each word candidate represent its distance value (recognition similarity). The smaller the value, the higher is the probability of being correct.

However, the problem with the second display example of FIG. 4 is that it will take longer than in the first display example of FIG. 3 for the user to search the displayed word candidate lattice for the word string, namely, the right answer of the input sentence.

The above-described problems arise not only in a voice recognition system but also in a character recognition system. FIG. 5 illustrates a conventional character recognition system.

A string of characters written by the user on an input tablet 501 is digitized first and then sequentially entered into a feature amount extractor 502 where the feature amount of each character is extracted for conversion into a feature vector pattern for each word.

A matching section 503 makes a comparison between the feature vector pattern of each of the characters and the feature vector pattern of each of characters stored in a template memory 504 while normalizing the size of characters. Thereby, a value of distance between each character stored in the template memory 504 and each input character, so that a plurality of character candidates are obtained for each input character.

The subsequent operations are the same as in the voice recognition system of FIG. 1.

FIG. 6 illustrates a display example of character candidates displayed by the display unit 109 (FIG. 5) in the conventional character recognition system. In this display example, a character candidate lattice in which a plurality of character candidates for each input character are displayed in the form of a table as in FIG. 4.

As can be seen from the display example of FIG. 6, however, the problem with the conventional character recognition system is that it takes a long time for the user to search the displayed character candidate lattice for the right answer of the input character string.

SUMMARY OF THE INVENTION

It is therefore an object of the present invention to shorten the time required for user to search for the correct answer and alleviate psychological burden imposed on the user.

The present invention is directed to a recognition apparatus having a man-machine function in which a plurality of recognition candidates resulting from a recognition process made on an input voice or character and a user is allowed to select the recognition result from among the displayed recognition candidates.

A priority order display unit is provided which displays the recognition candidates in a fixed order of priority.

According to a first aspect of the present invention, there is provided a recognition apparatus comprising a high-ranking candidate memory for storing predetermined high-ranking candidates in a plurality of recognition candidates resulting from a recognition process in order of recognition degree beginning with the highest, a sorter for rearranging the order of the recognition candidates in which they are stored in the high-ranking candidate memory into, for example, order of character codes or initials and a display unit for displaying the rearranged recognition candidates in the high-ranking candidate memory in order.

In the above configuration, the recognition candidates are displayed in a fixed order of priority, so that they are displayed with their initials arranged in alphabetical order and the user is allowed to easily search for the correct answer in the displayed recognition candidates when he designates a candidate corresponding to input voice.

According to a second aspect of the present invention, there is provided a recognition apparatus comprising a dictionary memory for storing each of recognition objects which can be recognition candidates together with attribute information representing the recognition object and an attribute-dependent display unit for classifying a plurality of recognition candidates resulting from a recognition process according to attribute information corresponding to each recognition candidate which is obtained by referring to the dictionary memory and displaying the recognition candidates for each of the classified groups.

Further, in the second aspect, the dictionary memory can be configured to store attribute information representing attributes of categories, such as parts of speech, concepts of words or roots of words, for each of recognition objects. In this case, a specifying section is provided which causes the user to specify a category of attribute information which becomes a candidate for classification by the attribute-dependent display unit. The attribute-dependent display unit can be configured to classify a plurality of the recognition candidates resulting from the recognition process according to the attribute information of the category specified by the user and display a plurality of the recognition candidates for each of the classified groups.

In the above configuration, when recognition candidates of an input word or character are displayed, attribute information is read from the dictionary memory for each of the recognition candidates as requested by the user and the recognition candidates are displayed in groups classified by attribute information. Thus, instead of searching for a correct input word or input character from above in order, the user is allowed to search for a relevant group first and find out the correct result in the relevant group with ease.

BRIEF DESCRIPTION OF THE DRAWINGS

Further objects and features will be apparent from the accompanying drawings and the following description of preferred embodiments of the present invention, In the drawings:

FIG. 3 illustrates a first display example in the conventional voice recognition system;

FIG. 4 illustrates a second display example in the conventional voice recognition system;

FIG. 6 illustrates a display example in the conventional character recognition system;

FIG. 12 illustrates a display example of the first preferred embodiment;

FIG. 15A illustrates a display example in the order of recognition distances;

FIG. 15B illustrates a display example of word roots;

FIG. 15C illustrates a display example of parts of speech;

FIG. 15D illustrates a display example of concepts; and

DESCRIPTION OF THE PREFERRED EMBODIMENTS

Description of a first fundamental

Figure 7:
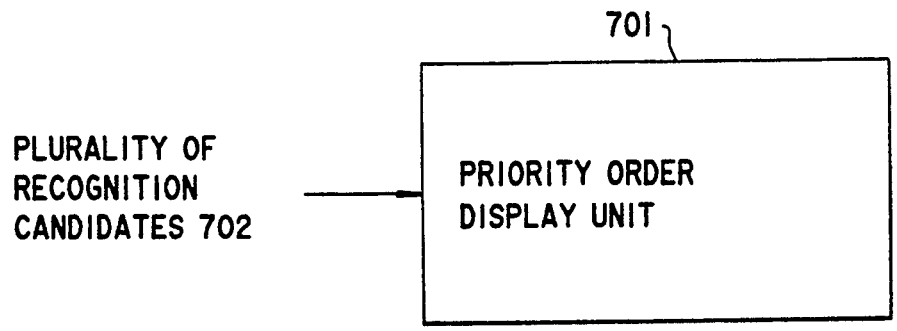
FIG. 7 illustrates a first fundamental of the present invention.

FIG. 7 illustrates a first fundamental of the present invention,

In FIG. 7, a plurality of recognition candidates resulting from recognition of a voice, etc., are displayed by a priority order display unit 701 in a fixed order of priority.

Description of a second fundamental

Figure 8:
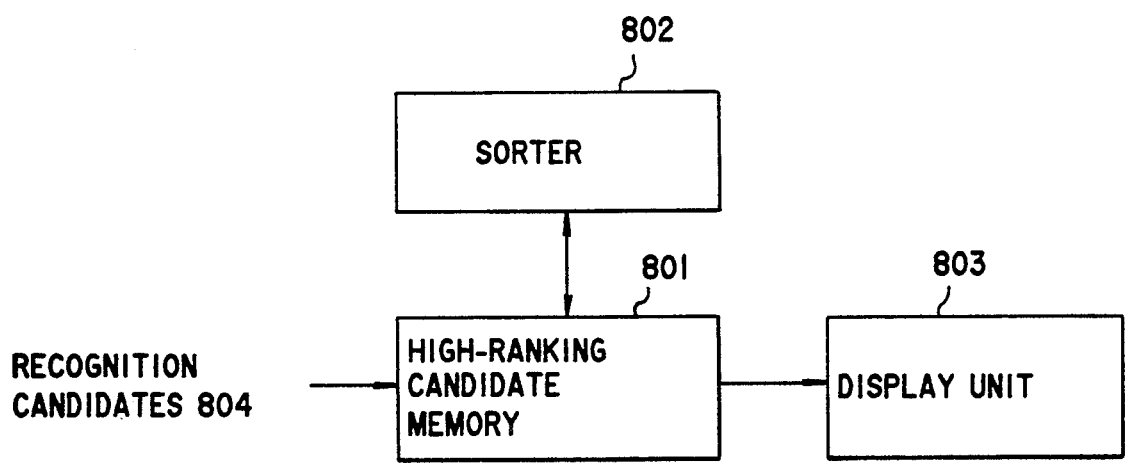
FIG. 8 illustrates a second fundamental of the present invention.

FIG. 8 illustrates a second fundamental of the present invention which is a more specific form of the first fundamental of FIG. 7.

Of a plurality of recognition candidates obtained in descending order of recognition degree, i.e., beginning with the highest, as a result of recognition of a voice, etc., a predetermined number of high-ranking recognition candidates 804 are stored in a high-ranking candidate memory 801.

Next, a sorter 802 rearranges the order in which the recognition candidates were stored in the high-ranking candidate memory 801 into a fixed order of priority, for example, in the order of dictionary (in the order of character string codes) or in the order of initials of the recognition candidates 804.

Further, the character strings of the recognition candidates 804 in the high-ranking candidate memory 801 which have been rearranged by the sorter 802 are displayed in turn by a display unit 803. Here, the display unit 803 may be arranged such that, when the recognition candidates 804 in the high-ranking candidate memory 801 which have been rearranged by the sorter 802 are displayed in turn, recognition candidates having a high possibility of being correct and recognition candidates having little possibility of being correct are displayed in a distinguishable manner, for example, in different brightness, display colors or character styles or in a reverse display mode. Also, the display unit 803 may be arranged to display the recognition candidates 804 so as to indicate a recognition candidate having the highest possibility of being correct.

According to the first and second fundamentals, recognition candidates are displayed in a fixed order of priority. For example, the candidates are displayed with their initials arranged in the alphabetical order. Therefore, the user is permitted to easily select the correct candidate matching the input utterance from among the displayed recognition candidates.

If, in the above display state, recognition candidates which are higher in possibility of being correct and recognition candidates which are not so high are displayed in a distinguishable manner, or a cursor is moved beforehand to the position of a recognition candidate which is high in the possibility of being correct, the user will be allowed to search for the correct candidate more quickly.

Description of a third fundamental

Figure 9:
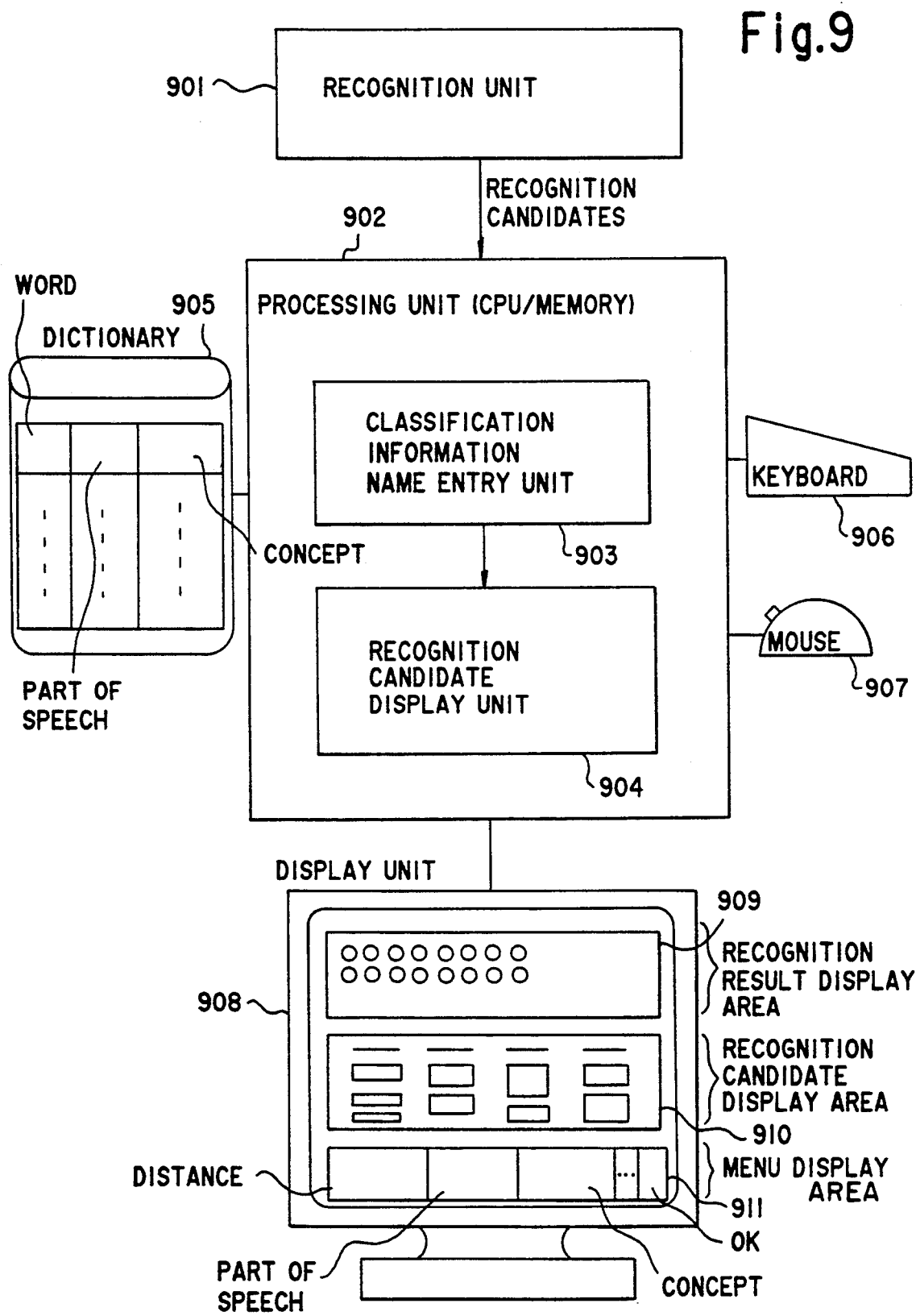
FIG. 9 illustrates a third fundamental of the present invention.

FIG. 9 illustrates a third fundamental of the present invention which is a more specific form of the second fundamental of FIG. 7.

A recognition unit 901 informs a processing unit 902, which is equipped with a CPU, a memory, etc., of a plurality of recognition candidates obtained in descending order of recognition degree as a result of voice or character recognition.

The processing unit 902 displays the recognition candidates on a display unit 908 to thereby allow the user to specify the final recognition result.

When displaying the recognition candidates, which are either word candidates or character candidates, on a recognition candidate display area 910 of the display unit 908, the processing unit 902 classifies them according to attribute information based on a predetermined criterion for classification as requested by the user.

To implement such a function, a dictionary 905 stores attribute information for classifying words or characters to be recognized into groups such as parts of speech, concepts, etc.

The recognition candidate display unit 904 refers to the dictionary 905 and then classifies recognition candidates generated by the recognition unit 901 according to their attribute information into groups. Each group of recognition candidates is displayed on the recognition candidate display area 909 of the display unit 908.

A candidate selected by the user with a mouse 907 on the recognition candidate display area 910 becomes the final recognition result. The selected candidate is displayed on a recognition result display area 909 and then the recognition candidate display area 910 is cleared.

As the attribute information for grouping recognition candidates several types of information, such as parts of words, concepts, roots, etc., are prepared. A classification information name representing the type of corresponding attribute information is added to each of words stored in the dictionary 905.

A classification information name entry unit 903 displays these classification information names as menu items on a menu display area 911 so as to allow the user to specify any of the above classification names arbitrarily. When the user specifies one of the classification information names on the menu with the aid of the mouse, the attribute information corresponding to the specified classification information name is used as the grouping criterion when the recognition candidate display unit 904 displays each recognition candidate on the recognition candidate display area 910 of the display unit 908.

That is, the recognition candidate display unit 904 groups the recognition candidates according to attribute information corresponding to the specified classification information name. The recognition candidates in the same group are sorted in the order of their recognition distances informed by the recognition unit 901 and are displayed on the recognition candidate display area 10 of the display unit 908.

Here, the recognition candidate display unit 904 displays groups of recognition candidates in different display attributes, i.e., display color, character size or brightness, for easier distinguishing among the groups.

With the third fundamental of the present invention, when recognition candidates of an input word or character are displayed, attribute information is read from the dictionary 905 for each of the recognition candidates as requested by the user, and the recognition candidates are displayed in groups classified according to the attribute information. Thus, instead of looking at the recognition candidates displayed on the recognition candidate display area 910 in turn from above to search for the correct input word or character, the user is allowed to search for a relevant group first and then easily find the correct candidate from the relevant group.

It is to be noted that, in this case, the user has only to specify a classification information name, which is used as a criterion for grouping, through the menu display area 911 in order for the recognition candidate display unit 904 to perform the most suitable grouping.

Description of a first preferred embodiment

Hereinafter, preferred embodiments of the present invention will be described with reference to the drawings.

Figure 10:
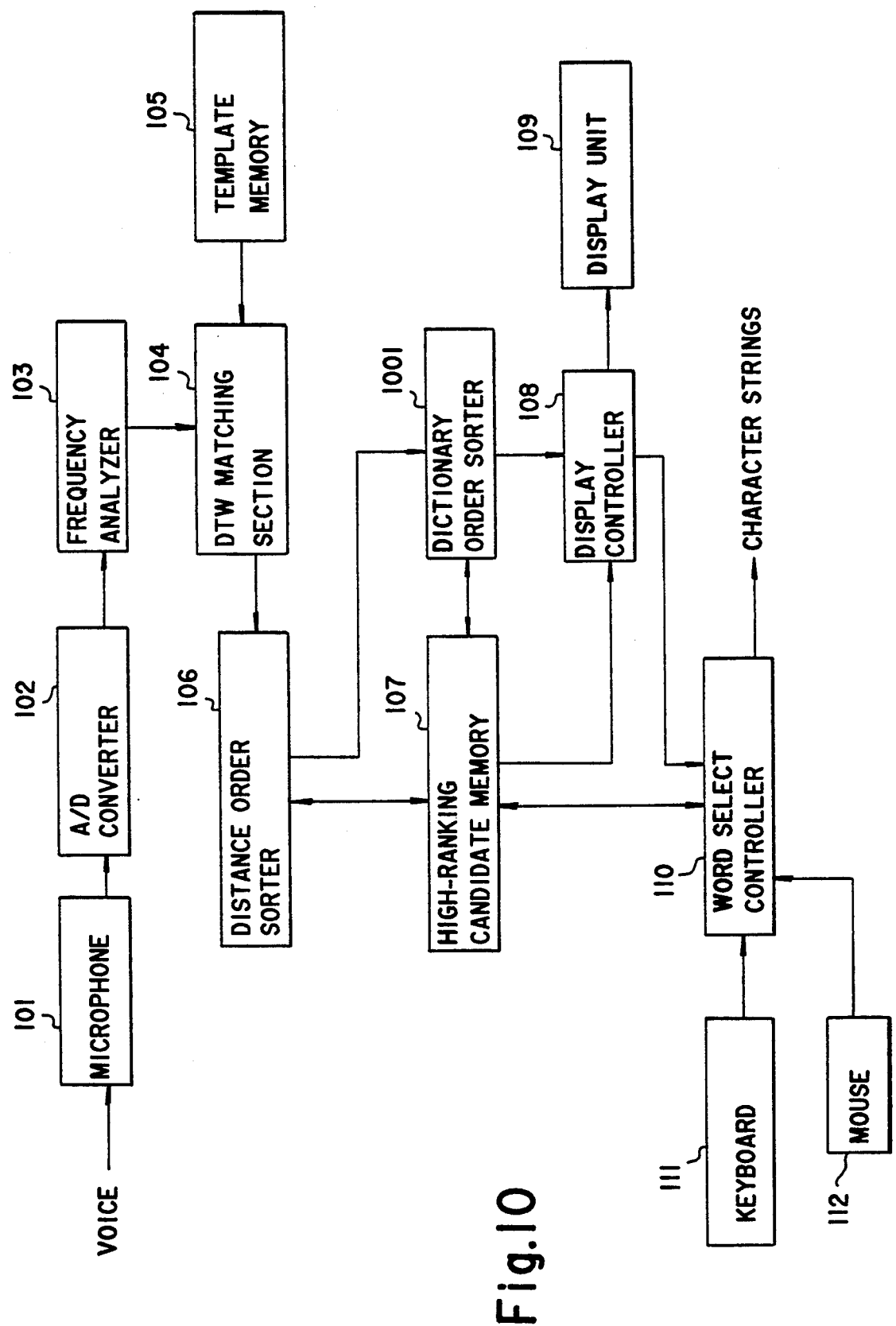
FIG. 10 is a block diagram of a first preferred embodiment of the present invention.

FIG. 10 is a block diagram of a first preferred embodiment of the present invention. The present embodiment corresponds to the first fundamental of the present invention shown in FIG. 7 or the second fundamental of the present invention shown in FIG. 8 and is directed to a voice recognition system.

Figure 1:
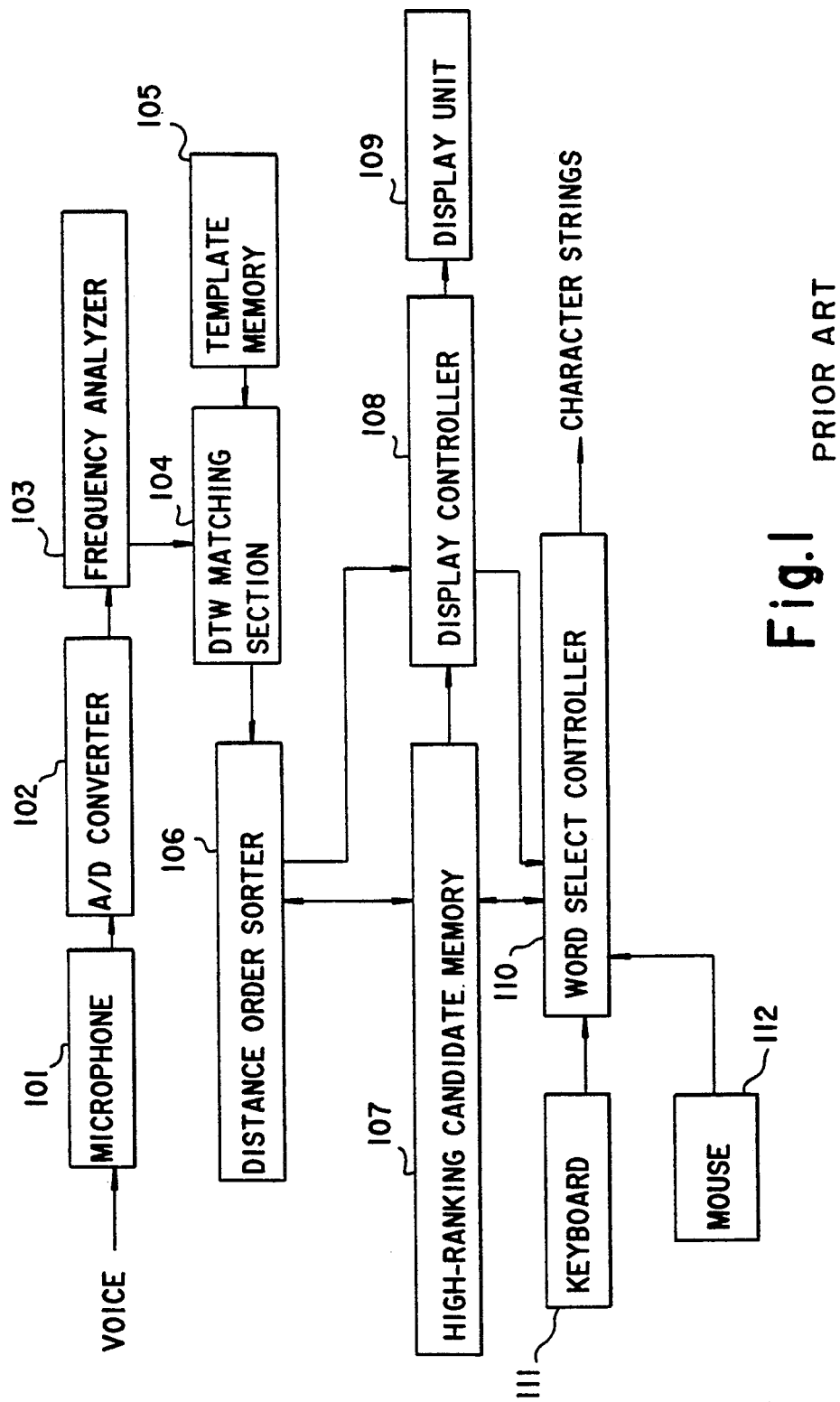
FIG. 1 is a block diagram of a conventional voice recognition system.

In FIG. 10, the parts designated by the same numerals as in the prior art of FIG. 1 have like functions.

The present embodiment is distinct from the prior art in that a sort termination signal (hereinafter referred to as a distance order sort termination signal) from the distance order sorter 106 is applied to a dictionary order sorter 1001, not to the display controller 108 as in the first prior art.

Upon receipt of the distance order sort termination signal, the dictionary order sorter 1001 resorts character strings of word candidates stored in the high-ranking candidate memory 107 in the order of distance into a dictionary order (character code order). Then, the dictionary order sorter 1001 sends a dictionary order sort termination signal to the display controller 108 at the termination of sorting into the dictionary order.

Upon receipt of the sort termination signal, the display controller 108 displays the character strings of word candidates which have been stored in the high-ranking candidate memory 107 in the dictionary order and their ranking numbers in turn on the display unit 109. The subsequent operations are the same as those in the prior art of FIG. 1.

Figure 11:
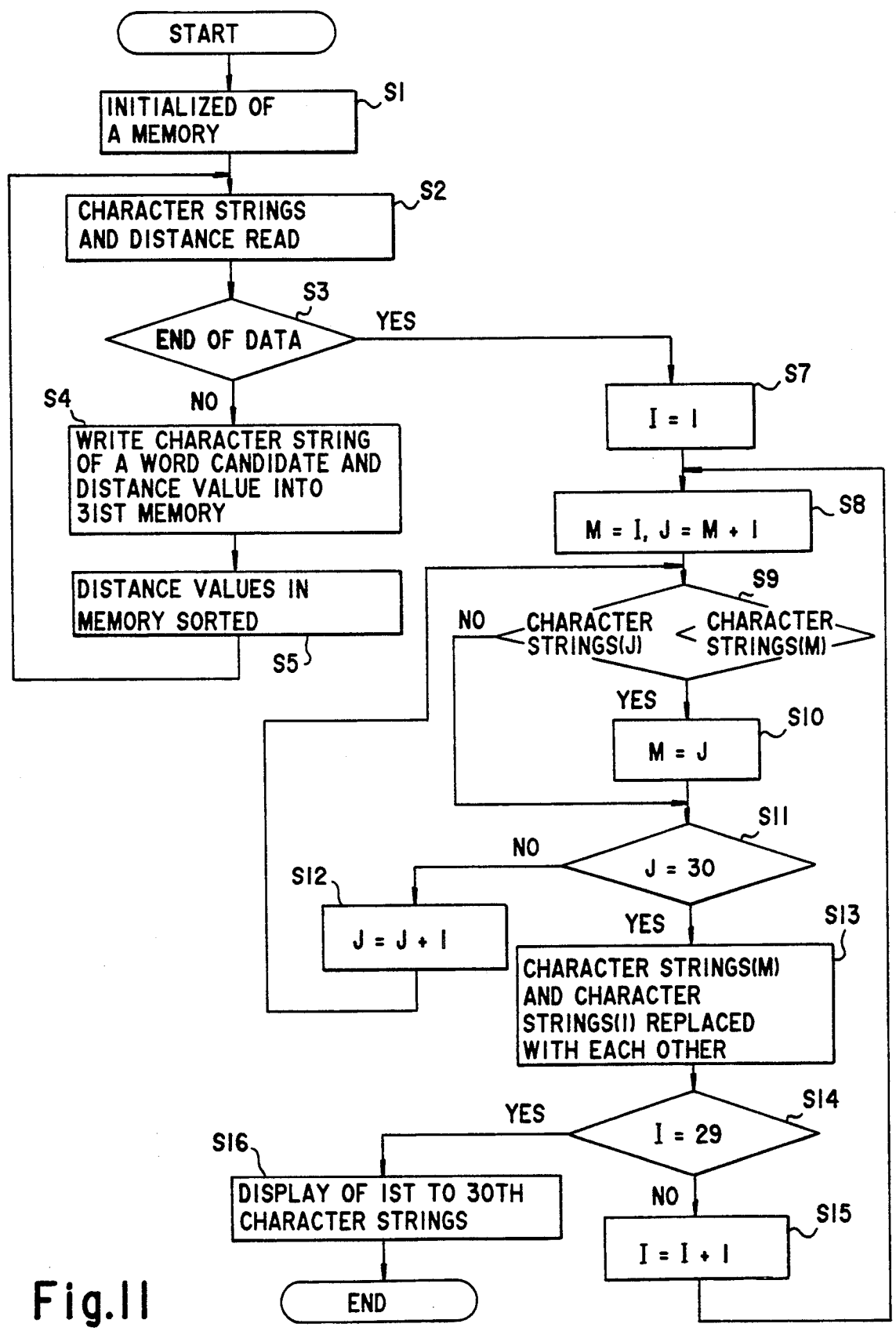
FIG. 11 is a flowchart for use in explanation of the operation of the first preferred embodiment of the present invention.

FIG. 11 is a flowchart of the operation of the present embodiment which takes, as an example, the case where word candidates which take the first to thirtieth ranks in the order of distance are obtained from the distance order sorter 106 and then rearranged into the dictionary order, i.e., into descending order of character codes for subsequent display.

Figure 2:
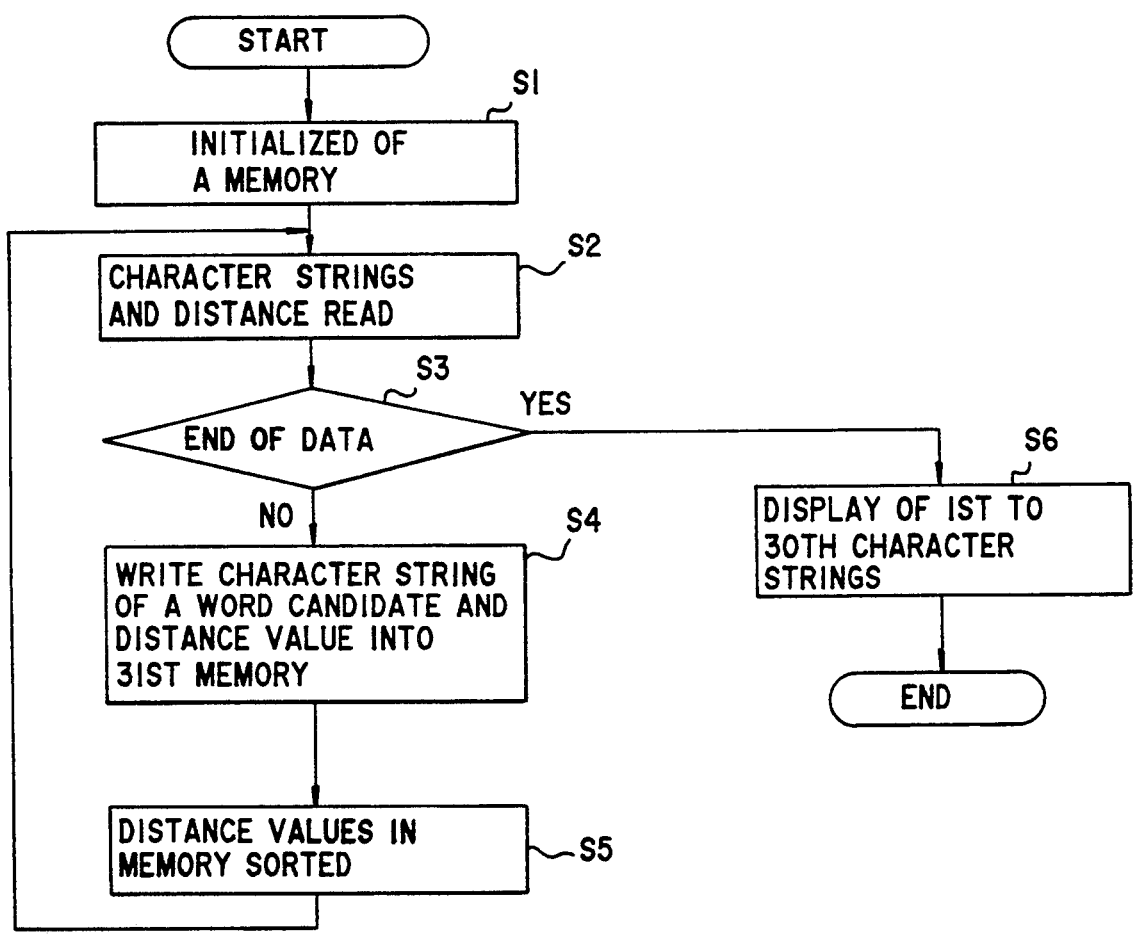
FIG. 2 is a flowchart for use in explanation of the operation of the conventional voice recognition system of FIG. 1.

First, steps S1 to S5 carried out by the distance order sorter 106 are the same as those in the prior art of FIG. 2. Thereby, the character strings and distance values of word candidates in the distance order are obtained in the 1st to 30th address areas of the high-ranking candidate memory 107.

Next, upon receipt of the distance order sort termination signal from the distance order sorter 106, the dictionary order sorter 1001 carries out processes indicated in steps S7 to S15, thereby resorting the word candidates stored in the high-ranking candidate memory 107 into descending order of character codes.

First, pointers I, J and K for pointing to the 1st to 30th address areas of the high-ranking candidate memory 107 are prepared. In step S7, the pointer I is set to the starting address value 1 of the high-ranking candidate memory 107. In step S8, the pointer M is set to the content of the pointer I, and the pointer J is set to the pointer M+1. That is, the pointer M is set to the starting address value 1 and the pointer J is set to the next address value 2.

A comparison is made, in step S9, between the code value of a character string stored in the address pointed to by the pointer M and the code value of a character string stored in the address pointed to by the pointer J while the value of the pointer J is incremented by +1 in step S12.

Then, if the code value for the pointer J is smaller than the code value for the pointer M, YES results in step S9. In subsequent step S10, the value of the pointer M is moved to the address pointed to by the pointer J.

The above operations are repeated until it is determined in step S11 that the value of the pointer J is equal to 30, that is, until the last address of the high-ranking candidate memory 107 is reached.

When the last address is reached, a character string in the address pointed to by the pointer M will have the smallest code value of 30 word candidates. Then, in step S13, the character string in the address pointed to by the pointer M and the character string in the first address are replaced with each other, so that the character string of a word candidate which is the smallest in code value will be stored in the first address.

Subsequently, in step S15, the pointer I is incremented by one. Subsequently, after step S8 in which M=I and J=M+1, steps S9 to S12 are repeated again. When YES results in step S11, a character string in the address pointed to by the pointer M will be the smallest in code value of the character strings of 29 word candidates except the character string which is the smallest in code value. Thus, the character string in the address pointed to by the pointer M and the character string in the second address pointed to by the pointer I are replaced with each other, so that a word candidate which is the second smallest in code value will be stored in the second address.

The above operations are repeated while the pointer I is incremented by one in step S15. When the content of the pointer I becomes 29, that is, when NO results in step S14, the character strings of word candidates will have been stored in the addresses 1 to 30 of the high-ranking candidate memory 107 in descending order of code values.

When the above sort process by the dictionary order sorter 1001 terminates, a dictionary order sort termination signal is sent from the dictionary order sorter 1001 to the display controller 108. Thereby, in step S16 of FIG. 11, the display controller 108 displays the character strings of word candidates stored in the 1st to 30th address areas of the highranking candidate memory 107 on the display 109.

FIG. 12, is a display example of word candidates on the display 109 which is based on the above process. As can be seen, the word candidates are displayed with their initials arranged in alphabetical order, thus permitting the user to easily specify the correct word "OOSAKA" corresponding to the input utterance from among the displayed word candidates.

In the display state of FIG. 12, words having a high possibility of being correct, in other words, words having small distance values and words having little possibility of being correct can be displayed in a visually distinguishable manner. In this case, it is necessary only that the results which have been sorted in the order of distance be left in the distance order sorter 106 and their ranking be sent to the display controller 108. As means of visually distinguishable display, the words may be displayed in different colors, character styles or brightness according to the order of distance. A reverse display mode may also be used.

The word select controller 510, when accepting the ranking numbers of the word candidates entered by the user through the keyboard 511 or the mouse 112, can be arranged to move the cursor to the position of a word having a high possibility of being correct in advance.

Description of a second preferred embodiment

Figure 13:
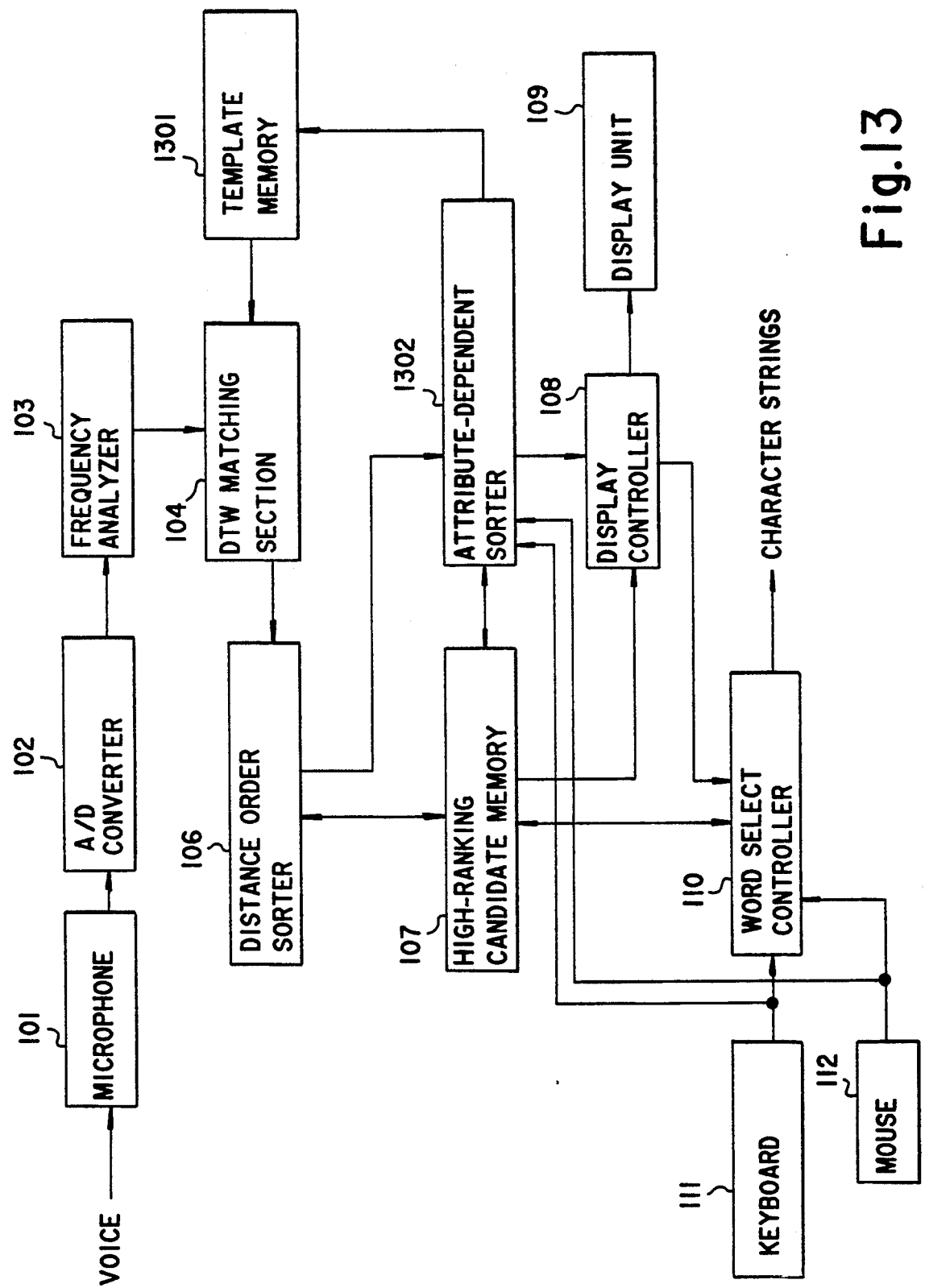
FIG. 13 is a block diagram of a second preferred embodiment of the present invention.

FIG. 13 is a block diagram of a second preferred embodiment of the present invention. The present embodiment, which corresponds to the third fundamental of the present invention shown in FIG. 9, is directed to the voice recognition system.

In FIG. 13, blocks designated by the same numerals as those in the prior art of FIG. 1 and the first preferred embodiment of the present invention of FIG. 10 have corresponding functions.

The embodiment of FIG. 13 is distinct from the first preferred embodiment of FIG. 10 in that an attribute-dependent sorter 1302 having an expanded function is provided in place of the dictionary order sorter 1001. In the first preferred embodiment, word candidates are sorted in the dictionary order, i.e., in the descending order of character string codes in the dictionary order sorter 1001, while, in the second preferred embodiment of FIG. 13, word candidates are sorted (grouped) in the attribute-dependent sorter 1302 according to pieces of attribute information, such as part of speech, concept, etc., which are stored in a template memory 1301 (corresponding to 105 of FIG. 10) for each word candidate.

That is, as the attribute information used as the criterion for sorting word candidates, a plurality of pieces of information, such as parts of speech, concepts, word roots, etc., are prepared. A classification information name representing the type of attribute information is assigned to each of the words stored in the template memory 1002.

In displaying word candidates on the display 109, the user can previously select any attribute information according to which the word candidates are to be sorted for subsequent display. To implement such a facility, such a display image as shown in FIG. 14 is displayed on the display 109.

Figure 14:
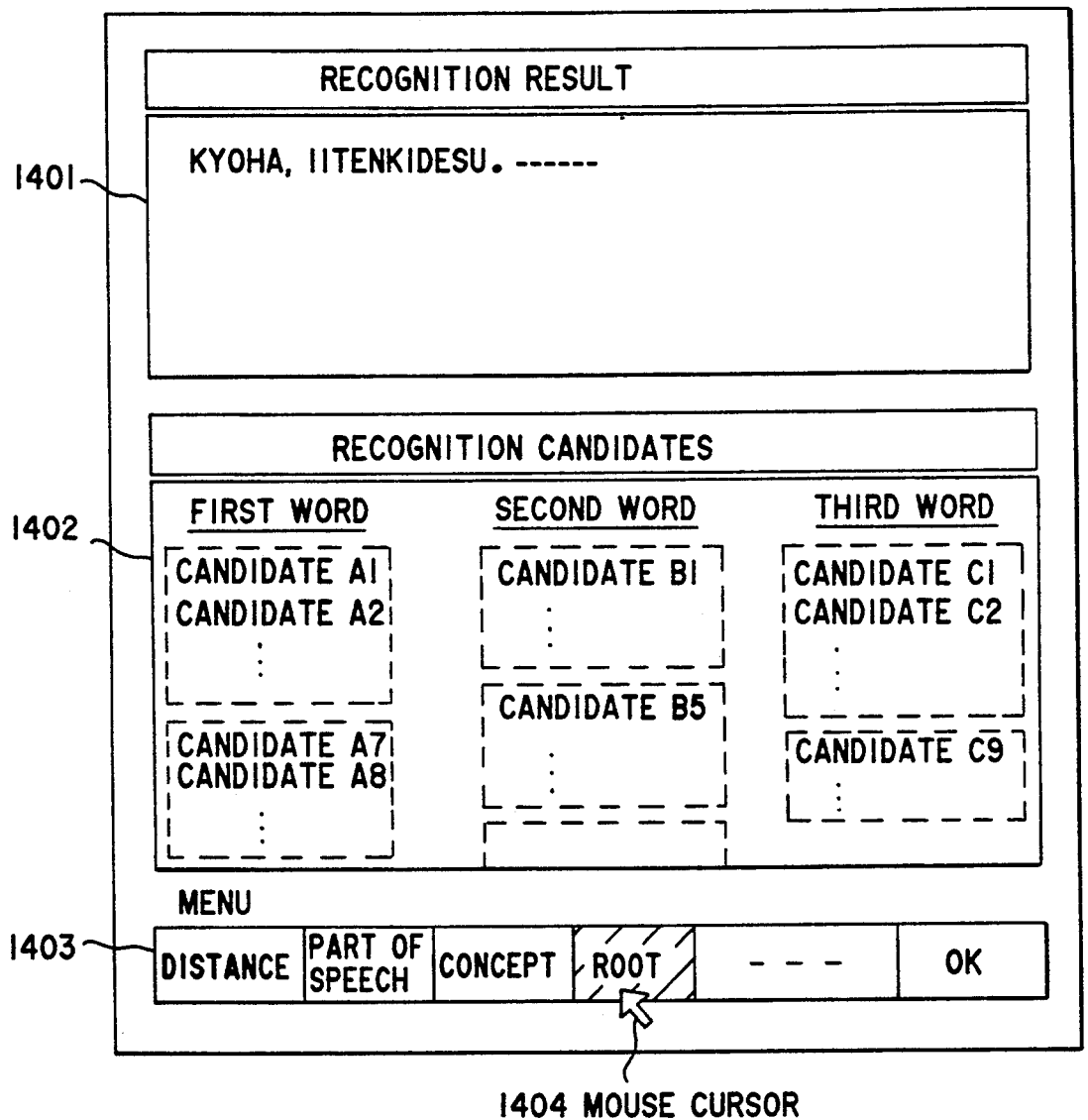
FIG. 14 illustrates an example of a display screen in the second preferred embodiment.

In FIG. 14, menu items, such as "distance", "part of speech", "concept", "roof", ..., "OK", etc., are displayed on menu display area 1403. The user is allowed to operate the mouse 112 of FIG. 13 and move the mouse cursor 1404 on the display screen of FIG. 14. Thereby, the user is allowed to specify an arbitrary menu item on the menu display area 1403 and select a classification information name (attribute information) that is used as a criterion for sorting (grouping) word candidates.

The selected classification information name is entered into the attribute-dependent sorter 1302.

Upon receipt of a distance order sort termination signal, the attribute-dependent sorter 1302 sorts the character strings of word candidates, which have been stored in the high-ranking candidate memory 107, by the attribute information corresponding to the classification information name specified by the user while referring to the template memory 504. The attribute-dependent sorter 1302 sends a sort termination signal to the display controller 108 at the termination of the sorting by attributes.

Upon receipt of the sort termination signal, the display controller 108 displays the character strings of word candidates and their ranking numbers, which are stored in the high-ranking candidate memory 107 in groups classified by attributes, in order on a recognition candidate display area 1402 (see FIG. 14). The subsequent operations are the same as in the first preferred embodiment.

In the above configuration, when the user specifies, for example, "distance" the word candidates will be displayed in the order of recognition distance as in the first prior art. Moreover, when the user specifies, for example, "part of speech", the word candidates are displayed grouped into parts of speech. Furthermore, when the user specifies, for example, concept, the word candidates are displayed grouped into concepts. When the user specifies, for example, "root", the word candidates are displayed grouped into roots. In addition to these examples of attributes, other attributes may be used as criteria for grouping.

The user can operate the mouse 112 of FIG. 13 to move the mouse cursor 1404 on the recognition candidate display area 1402 of FIG. 14, thereby selecting any word candidate for each word. When the user specifies "OK" on the menu display area 1403, the selection of a word candidate is decided and then the selected word candidate is moved to a recognition result display area 1401 to be displayed. When selection from among word candidates of each word is omitted, for example, a candidate which is the smallest in recognition distance will stand as the result of recognition.

When the result of recognition is decided, the recognition candidate display area 1402 is cleared and then each candidate in a word string for the next input utterance will be displayed.

In the recognition candidate display area 1402, word candidates grouped for each of words, such as the first word, the second word, the third word and so on, are displayed as shown in FIG. 14. If word candidates are too many for the recognition result display area 1402 to display, the user may operate the keyboard 111 or the mouse 112 of FIG. 13 to display low-ranking word candidates by means of scrolling.

FIGS. 15A through 15D illustrate display examples classified by attributes. In these figures there are illustrated examples in the case where a Japanese word, for example, "SEITO" is uttered .

FIG. 15A illustrates a display example according to recognition distance order. As with the first prior art, character strings of word candidates are displayed in ascending order of recognition distance.

FIG. 15B illustrates a display example in which word candidates are classified by word roots. Each word candidate is displayed classified into word roots, such as "SEN" "SEI" etc in Japanese Thus, the user is allowed to easily find out the correct input word "SEITO". If, in this case, the root groups are displayed in different colors, the visibility can be further improved.

FIG. 15C illustrates a display example in which word candidates are classified by parts of speech. Each word is classified according to parts of speech, such as "MEI-SHI" (corresponding to "noun" in English), "DOU-SHI-RENYOU" (corresponding to a type of "verb" in English), "DOUSHI-SHUSHI" (corresponding to a type of "verb" in English), etc.

FIG. 15D illustrates a display example in which word candidates are classified by concepts, such as "human", "physical movement", activity to concrete objects, etc.

Description of a third preferred embodiment

Figure 16:
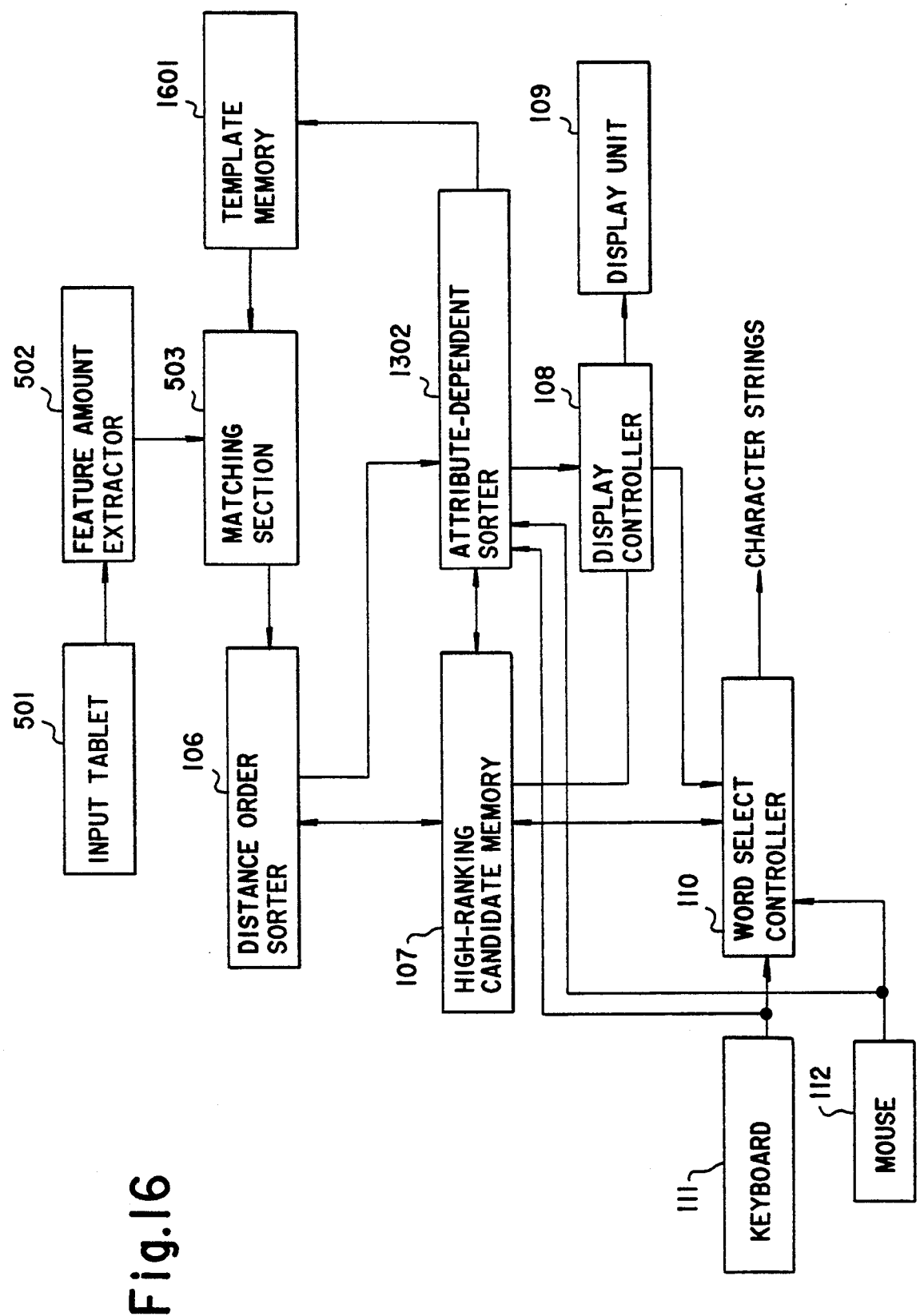
FIG. 16 is a block diagram of a third preferred embodiment of the present invention.

FIG. 16 is a block diagram of a third embodiment of the present invention. The present embodiment, which corresponds to the third fundamental of the present invention shown in FIG. 9, is applied to a character recognition system.

Figure 5:
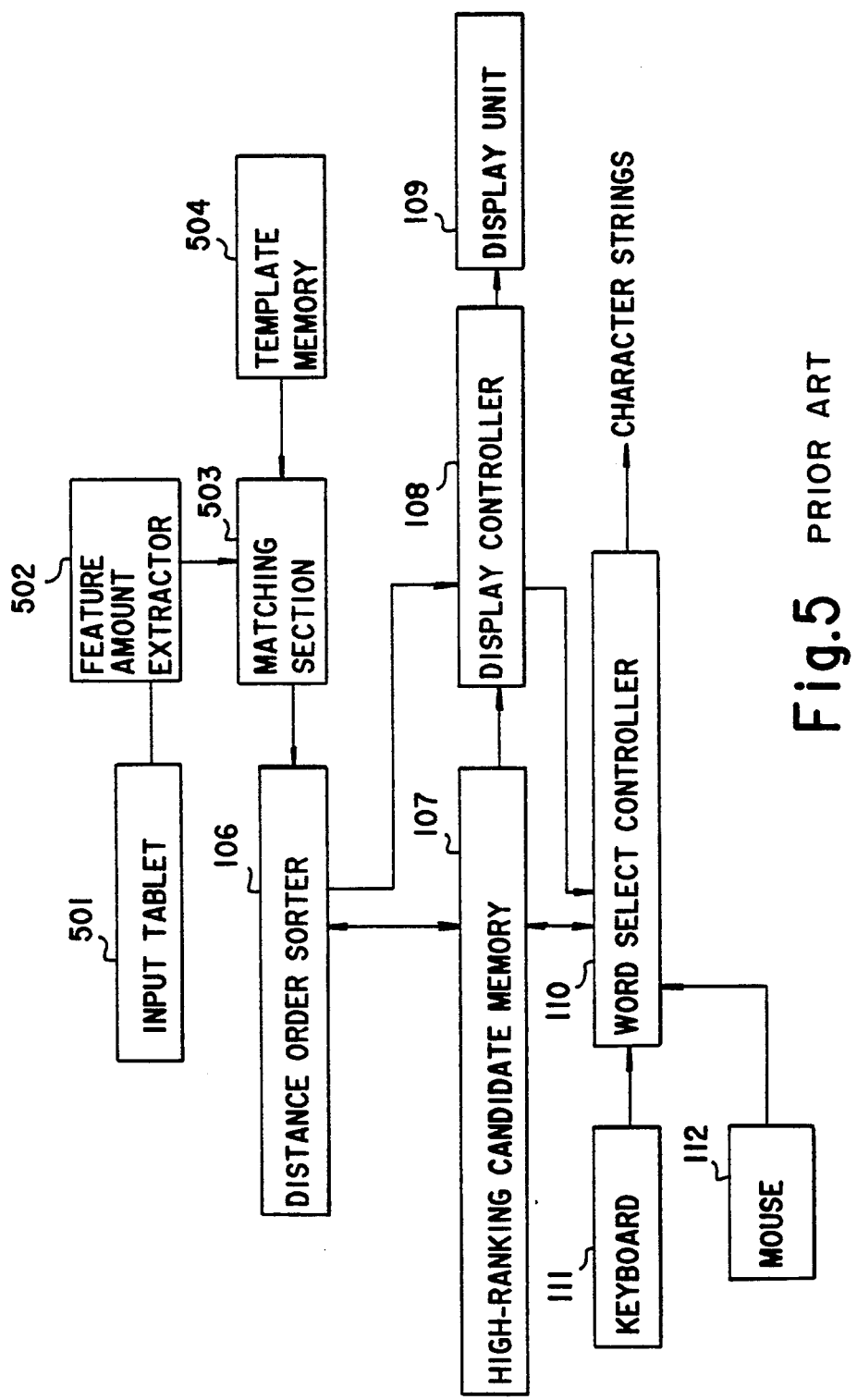
FIG. 5 is a block diagram of a conventional character recognition system.

In FIG. 16, the blocks which are designated by the same numerals as in the prior art of FIG. 5, the first preferred embodiment of the present invention shown in FIG. 10 and the second preferred embodiment of the present invention shown in FIG. 13 have like functions.

In the present embodiment, as with the prior art of FIG. 5, a character string written by the user on the input tablet 501 is digitized first and then entered into the feature amount extractor 502 where the feature amount of each character is extracted to obtain its feature vector pattern. The matching section 503 makes a comparison between the feature vector pattern of each character and the feature vector pattern of each of character stored in a template memory 1601 (corresponding to 504 in FIG. 5) while performing normalization of character size. Thereby, the distance value between each character stored in the template memory 1601 and each input character, thus obtaining a plurality of character candidates for each of input characters.

The subsequent operations are the same as those in the voice recognition system of FIG. 13. That is, in the present embodiment as well, character candidates are sorted (grouped) by the attribute-dependent sorter 1302 according to attribute information, such as parts of speech, concepts, etc., which are stored for each character in the template memory 1601 and displayed in groups on the display 109, as in the second preferred embodiment of FIG. 13.

In this way, the user can find out the correct input character easily as in the case of the second preferred embodiment.

What is claimed is:

1. A recognition apparatus for displaying a plurality of recognition candidates for an input voice or character and allowing a user to select a recognition candidate from among the displayed recognition candidates, comprising:
   high-ranking candidate storage means for storing a predetermined number of high-ranking recognition candidates from the recognition candidates obtained in descending order of recognition degree;
   sorting means for rearranging the order in which the recognition candidates are stored in said high-ranking candidate storage means in accordance with a fixed order of priority independent of the recognition degree; and
   display means for displaying the recognition candidates in said high-ranking candidate storage means, which have been rearranged by said sorting means, in order.

2. A recognition apparatus according to claim 1, in which said sorting means rearranges the storing order in which the recognition candidates are stored in said high-ranking candidate storage means into the order of character codes.

3. A recognition apparatus according to claim 1, in which said sorting means rearranges the storing order in which the recognition candidates are stored in said high-ranking candidate storage means into alphabetical order by initials of the recognition candidates.

4. A recognition apparatus according to claim 1, in which said display means displays a recognition candidate having a high possibility of being correct and a recognition candidate having a low possibility of being correct in a visually distinguishable manner in displaying the recognition candidates in said highranking candidate storage means which have been rearranged by said sorting means.

5. A recognition apparatus according to claim 1, in which said display means displays the recognition candidates in said high-ranking candidate storage means which have been rearranged by said storing means to specify a recognition candidate a having the highest possibility of being correct.

6. A recognition apparatus for displaying a plurality of recognition candidates obtained by recognition process applied to an input voice or character and allowing a user to select a recognition result from among the displayed recognition candidates, comprising:
   dictionary storage means for storing each of a plurality of objects of recognition which can be the recognition candidates together with attribute information, independent of recognition degree, representing a respective attribute; and
   attribute-dependent displaying means for classifying the recognition candidates into groups according to said attribute information obtained from said dictionary storage means and displaying the recognition candidates for each classified group.

7. A recognition apparatus according to claim 6, in which said dictionary storage means stores a plurality of pieces of attribute information each representing an attribute of a category for each of the objects of recognition, and includes specifying means for allowing the user to specify said category of attribute information which is a candidate for classification by said attribute-dependent display means; and
   said attribute-dependent display means classifies the recognition candidates according to the attribute information of a category specified by the user through said specifying means which is attribute information corresponding to each of the recognition candidates obtained by referring to said dictionary storage means and displays the recognition candidates for each classified group.

8. A recognition apparatus according to claim 7, in which the categories include at least one a part of speech, a concept and the root of a word.

9. A recognition apparatus according to claim 7, in which said specifying means comprises a mouse.

10. A recognition apparatus according to claim 6, in which said attribute-dependent display means displays recognition candidates in a same group in descending order of recognition degree.

11. A recognition-apparatus according to claim 6, in which said attribute-dependent display means displays the recognition candidate in a visually distinguishable manner for each classified group.

* * * * *